(12) United States Patent
Okada et al.

(10) Patent No.: US 7,604,084 B2
(45) Date of Patent: Oct. 20, 2009

(54) LAYOUT STRUCTURE FOR MOTOR-DRIVEN POWER STEERING UNIT CONTROLLER

(75) Inventors: Megumu Okada, Saitama (JP); Keita Yagi, Saitama (JP); Yotaro Mori, Saitama (JP); Takeshi Wakabayashi, Saitama (JP); Kihoko Kaita, Saitama (JP); Tomokazu Sakamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 183 days.

(21) Appl. No.: 11/528,465

(22) Filed: Sep. 28, 2006

(65) Prior Publication Data

US 2007/0074927 A1    Apr. 5, 2007

(30) Foreign Application Priority Data

Sep. 30, 2005  (JP)  ............... 2005-288492

(51) Int. Cl.
    *B62D 5/04*   (2006.01)
(52) U.S. Cl. ............................... 180/443
(58) Field of Classification Search ......... 180/443, 180/444, 400
    See application file for complete search history.

(56) References Cited

U.S. PATENT DOCUMENTS

| 5,982,137 | A | * | 11/1999 | Endo | ............... 318/812 |
| 6,789,008 | B2 | * | 9/2004 | Kato et al. | ............... 701/41 |
| 6,801,840 | B2 | * | 10/2004 | Kodama et al. | ............... 701/21 |
| 7,182,169 | B2 | * | 2/2007 | Suzuki | ............... 180/426 |
| 7,203,583 | B2 | * | 4/2007 | Fujimoto et al. | ............... 701/41 |
| 7,374,009 | B2 | * | 5/2008 | Yamamoto et al. | ............... 180/291 |
| 2001/0025733 | A1 | | 10/2001 | Kanai | |
| 2004/0080186 | A1 | | 4/2004 | Crepeau et al. | |
| 2005/0173918 | A1 | * | 8/2005 | Eguchi et al. | ............... 280/834 |

FOREIGN PATENT DOCUMENTS

JP    2663454 B2    6/1997
JP    10-074190 A    3/2006

* cited by examiner

*Primary Examiner*—Lesley D Morris
*Assistant Examiner*—Tashiana Adams
(74) *Attorney, Agent, or Firm*—Birch, Stewart, Kolasch & Birch, LLP

(57) ABSTRACT

To provide a layout structure for a motor-driven power steering unit controller configured to take into account the water level at which submergence of the vehicle is expected to occur. In a vehicle including a steering shaft rotatably supported on a vehicle body frame, a steering bar handle attached to the upper end of the steering shaft, a motor-driven power steering unit mounted onto the lower end of the steering shaft, and at least two front wheels, a controller for controlling the motor-driven power steering unit is laid out on the front side relative to the steering shaft and above a horizontal line indicative of the submergence limit of the vehicle.

20 Claims, 6 Drawing Sheets

LAYOUT STRUCTURE FOR MOTOR-DRIVEN POWER STEERING UNIT CONTROLLER

CROSS-REFERENCE TO RELATED APPLICATIONS

This nonprovisional application claims priority under 35 U.S.C. §119(a) on Patent Application No. 2005-288492, filed in Japan on Sep. 30, 2005, the entirety of which is incorporated herein by reference.

BACKGROUND OF THE INVENTION

1. Field of the Invention

The present invention relates to a layout structure for a motor-driven power steering unit controller.

2. Description of Background Art

A motor-driven power steering unit controller according to the background art includes a controller for controlling a drive motor (see, for example, Japanese Patent No. 2663454).

FIG. 6 of Japanese Patent No. 2663454 shows a controller 26 for controlling a drive motor 23 provided in a motor-driven power steering device. A saddle-ride type all-terrain vehicle shown in FIG. 1 of Japanese Patent No. 2663454 does not illustrate the above-mentioned controller 26, so that the specific layout of the controller 26 is not clear.

The saddle-ride type vehicle, for running on bad-conditioned grounds, may run across or longitudinally through a river, for example. Therefore, various component parts with which the vehicle is equipped, particularly electrical equipments, must be laid out taking into account the water surface on the assumption that the vehicle may run across or longitudinally through rivers and the like.

SUMMARY OF THE INVENTION

It is an object of the present invention to provide a layout structure for a component part (a motor-driven power steering unit controller) taking into account the water surface on the assumption that the vehicle may run across or longitudinally through rivers and the like.

According to a first aspect of the present invention, in a vehicle comprising a steering shaft rotatably supported on a vehicle body frame, a steering bar handle attached to the upper end of the steering shaft, a motor-driven power steering unit mounted onto the lower end of the steering shaft, and at least two front wheels, a controller for controlling the motor-driven power steering unit is disposed on the front side relative to the steering shaft and above a submergence limit of the vehicle.

In operation of the layout of the controller, the controller is disposed on the front side relative to the steering shaft and on the upper limit of the submergence limit of the vehicle. Therefore, it is ensured that where the submergence of the controller is expected, the driver can drive the vehicle while checking the positional relationship between the controller provided on the front side relative to the steering shaft and the water surface. Furthermore, since the controller is located at a high position above the submergence limit, the controller can be prevented from being submerged.

According to a second aspect of the present invention, the controller is disposed on the front side relative to an oil cooler for cooling engine oil.

In operation of the layout of the controller, when warmed engine oil is circulated through the oil cooler, the heat of the oil cooler is carried rearwards from the oil cooler by the running airflow, so that the controller laid out on the front side relative to the oil cooler is not influenced by the heat.

According to a third aspect of the present invention, the lower end of the steering shaft is rotatably supported on a housing added, in a turret-like form, to the motor-driven power steering unit. A rear wall of the housing is provided with an opening, and a wire for connecting the motor-driven power steering unit and the controller is passed through the opening.

In operation of the opening, with the opening provided in the rear wall of the housing, flying stones, rainwater, dust and the like coming from the front side of the vehicle will not easily enter into the housing. In addition, since the wire for connecting the motor-driven power steering unit and the controller is passed through the opening, the laying of the wire can be conducted easily.

According to a fourth aspect of the present invention, the submergence limit is at an atmosphere opening end of an air vent tube provided for a carburetor, or at a tail pipe opening of a muffler.

In operation of the submergence limit, the configuration in which the submergence limit is at the atmosphere opening end of the air vent tube or at the tail pipe opening ensures that the submergence of the inside of the carburetor or the inside of the muffler can be obviated by paying attention to the submergence limit at the time of running through rivers, damp grounds and the like.

According to the first aspect of the present invention, the controller for controlling the motor-driven power steering unit is laid out on the front side relative to the steering shaft and above the submergence limit of the vehicle, so that the vehicle can be driven while observing the controller and the water surface. In addition, with the controller disposed above the submergence limit, the controller can be prevented from being submerged.

According to the second aspect of the present invention, the controller is laid out on the front side relative to the oil cooler for cooling the engine oil, so that it is ensured that the controller is less liable to receive the heat of the oil cooler.

According to the third aspect of the present invention, the lower end of the steering shaft is rotatably supported on the housing added, in a turret-like form, to the motor-driven power steering unit, the rear wall of the housing is provided with the opening, and the wire for connecting the motordriven power steering unit and the controller is passed through the opening, so that it is ensured that flying stones, rainwater, dust and the like would not easily enter into the housing. In addition, the opening provided in the housing permits easy laying of the wire.

According to the fourth aspect of the present invention, the submergence limit is at the atmosphere opening end of the air vent tube provided for the carburetor, or at the tail pipe opening of the muffler, so that submergence of the inside of the carburetor or the inside of the muffler can be prevented by paying attention to the submergence limit during running.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
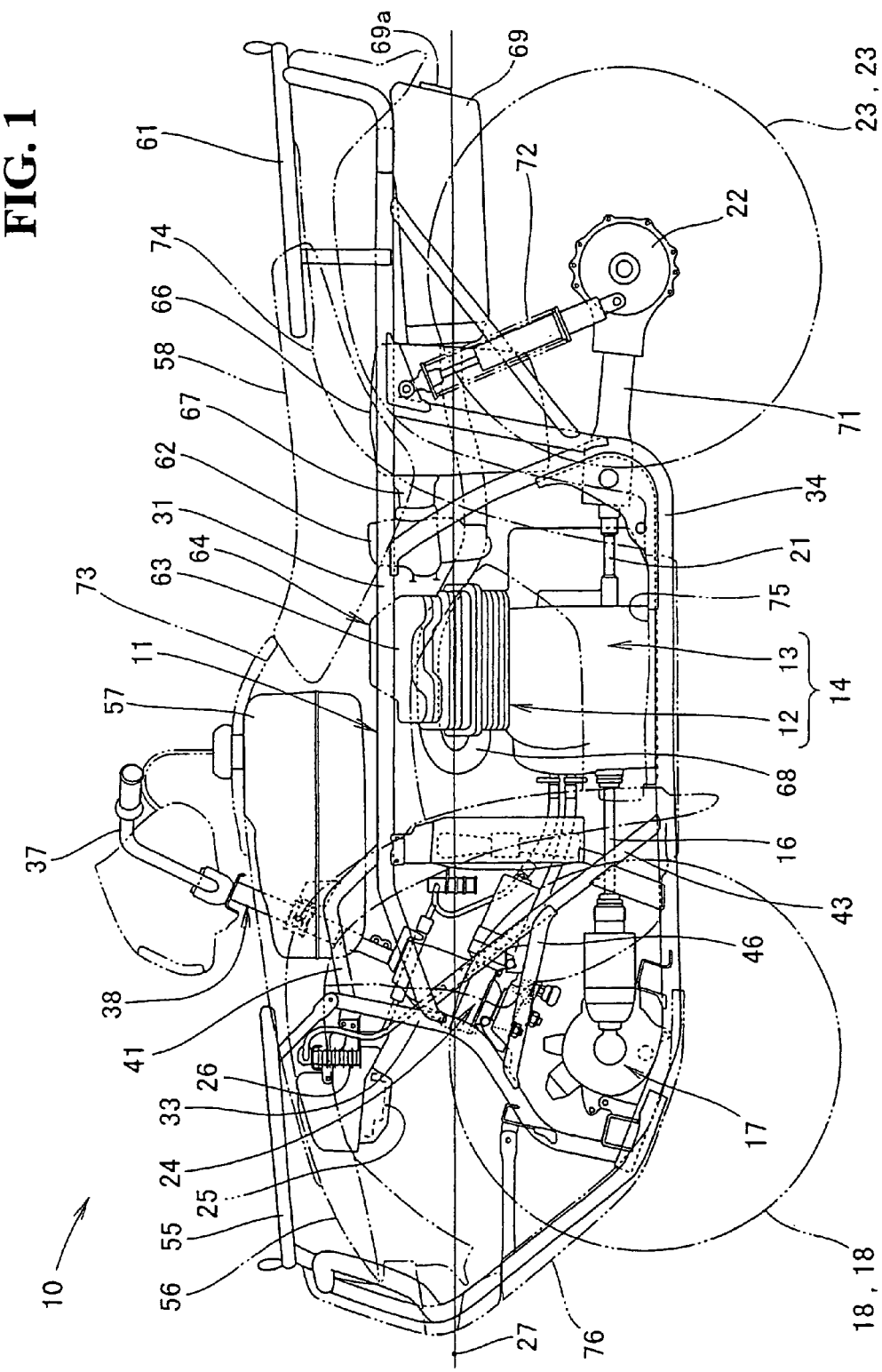
FIG. 1 is a side view of a vehicle configured by adopting a layout structure for a motor-driven power steering unit controller according to the present invention.

An embodiment of the present invention will now be described with reference to the accompanying drawings. The same reference numerals will be used to identify the same or similar elements throughout the several views. It should be noted that each of the drawings should be viewed in the direction of orientation of the reference numerals.

FIG. 1 is a side view of a vehicle configured by adopting a layout structure for a motor-driven power steering unit controller according to the present invention. An all-terrain vehicle 10 as the vehicle is a four-wheel-drive vehicle in which a power unit 14 composed of an engine 12 and a transmission 13 is mounted on a central portion of a vehicle body frame 11. A front final speed reduction gear 17 is connected to a front portion of the transmission 13 through a front propeller shaft 16. Left and right front wheels 18, 18 are connected to the front final speed reduction gear 17 through a drive shaft (not shown). A rear final speed reduction gear 22 is connected to a rear portion of the transmission 13 through a rear propeller shaft 21. Left and right rear wheels 23, 23 are connected to the rear final speed reduction gear 22 through a drive shaft (not shown). A motor-driven power steering unit 24 is provided for alleviating a steering force for steering the front wheels 18, 18. In the figure, reference numeral 25 identifies a controller for controlling the motor-driven power steering unit 24, and is laid out on the front side relative to an oil cooler 26 and above a horizontal line 27 indicating the submergence limit.

The horizontal line 27 is a line passing through the submergence limit set at the position of an opening (more specifically, the lower end of the opening) of a tail pipe 69a of a muffler 69 which will be described later.

The vehicle body frame 11 includes a left-right pair of upper main frames 31, 32 (only reference numeral 31 on the viewer's side is shown) that extend in the front-rear direction. A front frame 33 that has an inverted U-shape in front view is connected to the front ends of the upper main frames 31, 32. A left-right pair of lower main frames 34, 36 (only reference numeral 34 on the viewer's side is shown) is connected respectively to the lower ends of the front frame 33 and intermediate portions of the upper main frames 31, 32. A left-right pair of V-shaped front upper frames 41, 42 (only reference numeral 41 on the viewer's side is shown) that are laid sideways are connected respectively to the upper end of the front frame 33 and the upper main frames 31, 32 for rotatably supporting an upper portion of a steering shaft 38 fitted with a steering bar handle (handle bar) 37 at the upper end thereof. A left-right pair of inclined frames 43, 44 (only reference numeral 43 on the viewer's side is shown) extend rearwardly downwards from the front ends of the upper main frames 31, 32 to be connected to the lower main frames 34, 36. A left-right pair of sub inclined frames 46, 47 (only reference numeral 46 on the viewer's side is shown) is bridgingly connected respectively to intermediate portions of the inclined frames 43, 44 and the front frame 33 to thereby support a lower portion of the motor-driven power steering unit 24.

Reference numeral 55 identifies a front carrier. Reference numeral 56 identifies a front fender covering the upper and rear sides of the front wheels 18. Reference numeral 57 identifies a fuel tank. Reference numeral 58 identifies a seat. Reference numeral 61 identifies a rear carrier. Reference numeral 62 identifies a carburetor connected to the rear portion side of a cylinder head 63 of the engine 12. Reference numeral 64 identifies a cylinder portion projecting to the upper side of the power unit 24 and including the cylinder head 63. Reference numeral 66 identifies an air cleaner connected to the carburetor 62 through a connecting tube 67. Reference numeral 68 identifies an exhaust pipe that extends toward the vehicle rear side from a front portion of the cylinder head 63. Reference numeral 69 identifies the muffler connected to the rear end of the exhaust pipe 68. Reference numeral 69a identifies a tail pipe provided at the rear end of the muffler 69. Reference numeral 71 identifies a swing arm for supporting the rear wheels 23, 23 swingably relative to the lower main frames 34, 36. Reference numerals 72, 72 (only reference numeral 72 on the viewer's side is shown) identify a left-right pair of rear cushion units bridgingly attached to the swing arm 71 and the upper main frames 31, 32. Reference numeral 73 identifies a body side cover disposed on lateral sides of the power unit 14. Reference numeral 74 identifies a rear fender covering the upper and front sides of the rear wheels 23. Reference numeral 75 identifies a step floor. Reference numeral 76 identifies a skid plate covering front lower portions of the left and right lower main frames 34, 36 and the front side of the lower main frames 34, 36.

Figure 2:
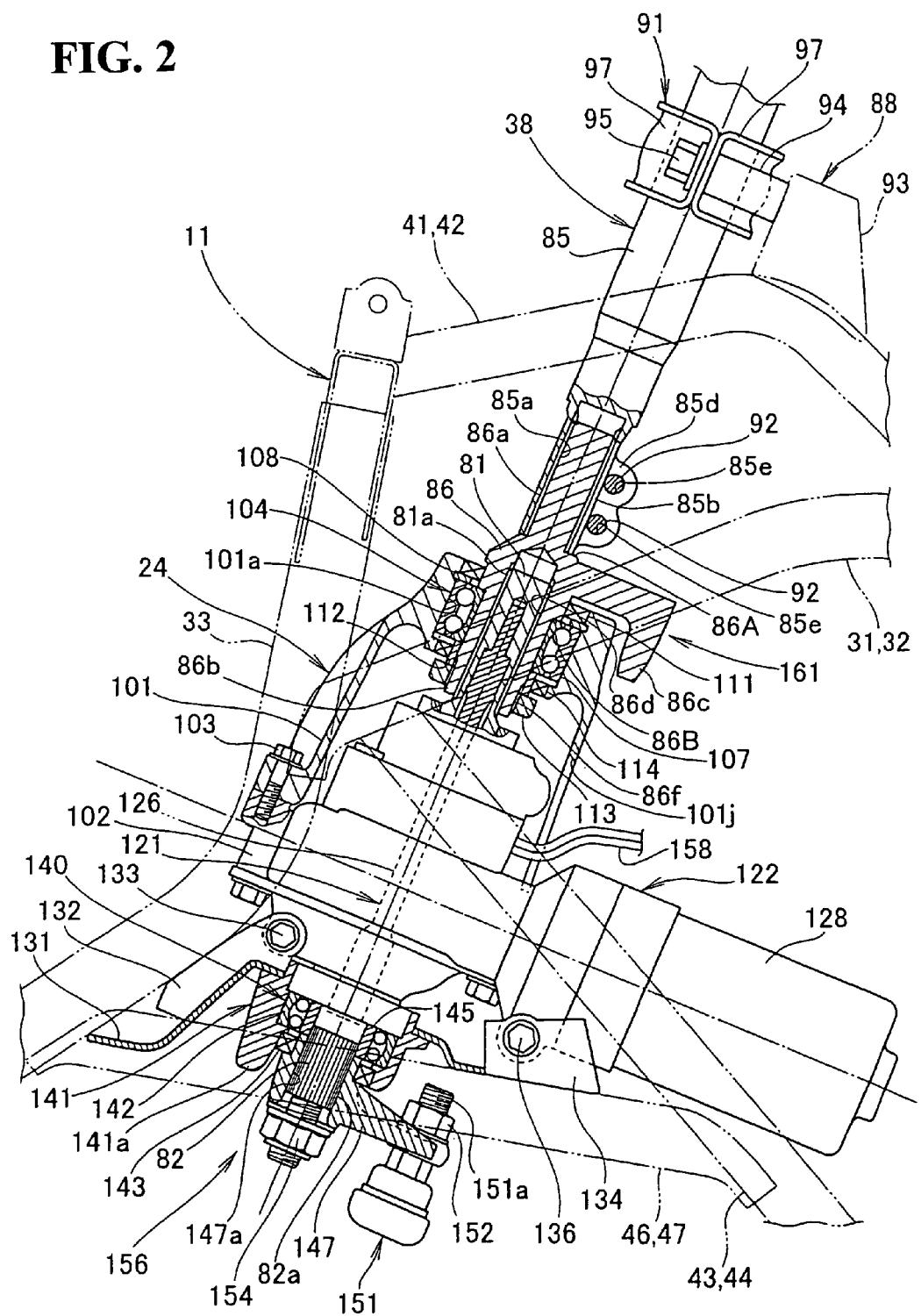
FIG. 2 is a side view of a first essential part of the vehicle according to the present invention.

FIG. 2 is a side view of an essential part of the vehicle according to the present invention, and shows that an upper portion of the vehicle body frame 11 rotatably supports an intermediate portion of the steering shaft 38. An input shaft 81 provided at an upper portion of the motor-driven power steering unit 24 is connected to the lower end of the steering shaft 38. A lower portion of the motor-driven power steering unit 24 is mounted onto a lower portion of the vehicle body frame 11. A lower portion of the vehicle body frame 11 rotatably supports an output shaft 82 provided at a lower portion of the motor-driven power steering unit 24.

The steering shaft 38 is composed of an upper shaft 85 fitted with the steering bar handle 37 (see FIG. 1) at the upper end thereof. A lower shaft 86 has an upper end that is serration connected to the lower end of the upper shaft 85 and a lower end that is serration connected to the input shaft 81.

The upper shaft 85 is a member rotatably attached, through an upper bearing portion 91, to a steering support bracket 88 bridgingly attached to the left and right front upper frames 41, 42. The upper shaft 85 is provided at its upper end with a female serration 85a for connection with a male serration 86a provided at the upper end of the lower shaft 86. The upper shaft 85 is also provided with an expanding slot 85b extending in the axial direction and communicating with both the female serration 85a side and the outer peripheral surface side. Projected portions 85c, 85d (only reference numeral 85d on the depth side is shown) are integrally formed respectively at both edge portions of the expanding slot 85b. Bolt insertion holes 85e are bored in the projected portions 85c, 85d. Bolts 92 are passed through the bolt insertion holes 85e. Nuts (not shown) are screw engaged with the tip ends of the bolts 92, whereby the lower end of the upper shaft 85 fastens the upper end of the input shaft 81. Incidentally, reference numeral 86A identifies a positioning portion provided in the lower shaft 86 for positioning by putting the tip end of the upper shaft 85 into abutment thereon.

The steering support bracket 88 is composed of a cross member 93 bridgingly connected to the front upper flames 41, 42. Left and right boss portions 94, 94 (only reference numeral 94 on the viewer's side is shown) are attached to the cross member 93. Bolts 95 are screw engaged with the boss portions 94, 94, whereby the upper bearing portion 91 is fixed.

The upper bearing portion 91 is composed of a bush (not shown) slidably fitted over the upper shaft 85, and a pair of metallic holders 97, 97 for holding the bush.

The lower shaft 86 is provided at a lower portion with a shaft portion 86b, and at an intermediate portion with an L-shaped projected portion 86c that projects rearwards and is L-shaped in section. The shaft portion 86b is provided with a female serration 86d for connection with a male serration 81a formed at the tip end of the input shaft 81.

The motor-driven power steering unit 24 has, annexed thereto, a housing 101 covering an upper portion thereof. The housing 101 is a member having a lower portion that is attached to a gear case 102 of the motor-driven power steering unit 24 by a plurality of bolts 103 and an upper portion that rotatably supports the shaft portion 86b of the lower shaft 86 through an intermediate bearing portion 104.

The intermediate bearing portion 104 is composed of a multi-row type upper bearing 107 fitted in a hole 101a opened in an upper portion of the housing 101 and fitted over the shaft portion 86b. A stop ring 108 positions one end of the upper bearing 107. A seal member 111 is fitted in one end portion of the hole 101a adjacently to the stop ring 108. A collar 112 is fitted over the shaft portion 86b and abuts on the other end of the upper bearing 107. A nut 113 is screw engaged with a male screw 86f at the tip end of the shaft portion 86b to thereby press and fix the other end of the upper bearing 107 through the collar 112. Incidentally, reference numeral 86B is a positioning portion formed in the shaft portion 86b for positioning by putting one end of the upper bearing 107 into abutment thereon.

The motor-driven power steering unit 24 is composed of the above-mentioned input shaft 81 and output shaft 82. A torque sensor portion 121 detects a steering torque. A power assist portion 122 generates power for assisting a steering force. The power assist portion 122 is controlled by a controller (not shown), based on the steering torque detected by the torque sensor portion 121 and the like. The torque sensor portion 121 has a torsion bar 126 for connecting the input shaft 81 and the output shaft 82.

When the input shaft 81 is rotated by an operation on the steering bar handle 37 (see FIG. 1), a relative rotational angle is generated between the input shaft 81 and the output shaft 82, and the torsion bar 126 is twisted. The twisting amount (torsion) is converted into a torque, whereby the steering torque is determined.

The power assist portion 122 is composed of an electric motor 128. A clutch (not shown) and a speed reduction gear (not shown; composed of a worm gear and a worm wheel) are interposed between an output shaft of the electric motor 128 and the output shaft 82.

The motor-driven power steering unit 24 has a configuration in which the gear case 102 on the front side relative to the output shaft 82 is attached to a plate-like lower bracket 131 provided at the sub inclined frames 46, 47, through a front support member 132 by a bolt 133. The gear case 102 on the rear side relative to the output shaft 82 is attached by a bolt 136 to a rear support member 134 provided at the sub inclined frames 46, 47. The motor-driven power steering unit 24 is a member in which a lower portion of the gear case 102 is supported by the front support member 132 and the rear support portion 134 at two front and rear positions, with the output shaft 82 therebetween.

The controller controls the power assist portion 122, based on the steering torque detected by the torque sensor portion 121, a steering angle detected by a steering angle sensor (not shown), the vehicle velocity of the all-terrain vehicle 10 (see FIG. 1), and the like.

A lower bearing portion 140 for rotatably supporting the output shaft 82 includes a shaft support member 141 attached to a central portion of the lower bracket 131. An automatic center adjusting type lower bearing 142 is attached to the shaft support member 141 so as to rotatably support the output shaft 82. A seal member 143 protects the lower bearing 142 from dust and the like. Incidentally, reference numeral 145 identifies a collar. The shaft support member 141 is provided on the vehicle front side with a lower projected portion 141a that projects to the lower side substantially along the output shaft 82.

Reference numeral 147 identifies a center arm, which is provided with a female spline 147a for spline connection with a male spline 82a formed at a lower end portion of the output shaft 82. Reference numeral 151 identifies a ball joint provided at its end portion with a bolt portion 151a, which is attached to a rear portion of the center arm 147 by a nut 152. Reference numeral 154 identifies a nut, which is screw engaged with a male screw provided at the tip end of the output shaft 82, whereby the center arm 147 is fixed to the output shaft 82.

The lower projected portion 141 of the shaft support member 141 and the center arm 147 constitute a lower steering handle stopper 156. Incidentally, reference numeral 158 identifies a wire for connection between the motor-driven power steering unit 24 and the controller 25 (see FIG. 1).

Figure 3:
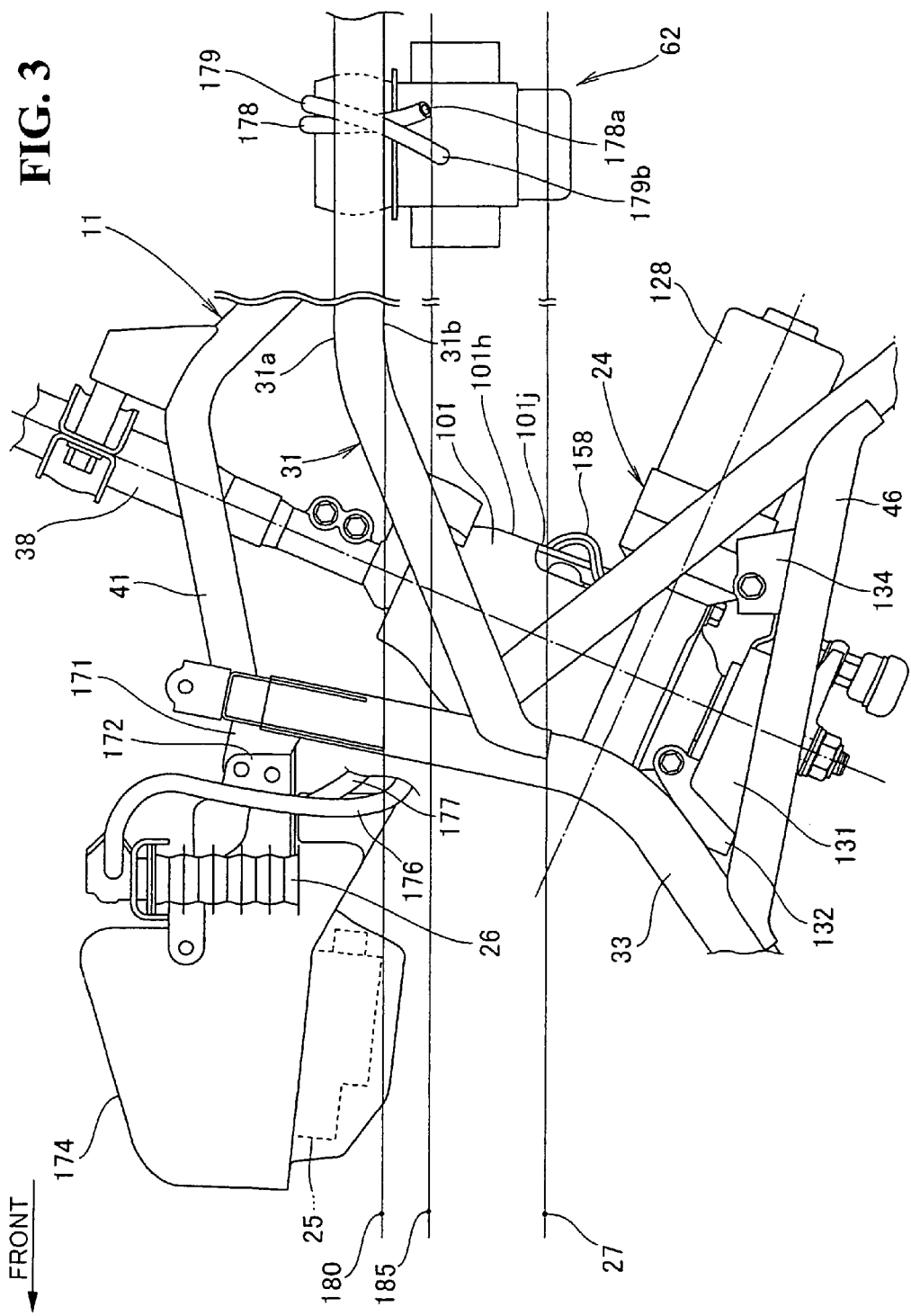
FIG. 3 is a side view of a second essential part of the vehicle according to the present invention.

FIG. 3 is a side view of a second essential part of the vehicle according to the present invention, and shows that an upper bracket 171 is attached to an upper portion of the front frame 33. An oil cooler 26 that cools lubricating oil in the power unit 14 (see FIG. 1) and an electrical equipment storage box 174 are attached to the upper bracket 171 through an upper stay 172. The controller 25 for the motor-driven power steering unit 24 is contained in the electrical equipment storage box 174. Incidentally, reference numerals 176 and 177 identify pipes for circulating the engine oil in the engine 12 into the oil cooler 26.

The electrical equipment storage box 174, particularly the controller 25 therein, is disposed on the vehicle front side relative to the oil cooler 26 and above the horizontal line 27 indicative of the limit in regard of submergence of the vehicle, i.e., the submergence limit.

A horizontal line 180 passing through the lower ends 31b, 32b (only reference numeral 31b on the viewer's side is shown) of upper straight portions 31a, 32a (only reference numeral 31a on the viewer's side is shown) of the upper main frames 31, 32 (only reference numeral 31 on the viewer's side is shown) is located above the horizontal line 27 passing through the submergence limit. The controller 25 is located above the horizontal line 180.

The submergence limit is at opening ends (namely, openings 178a, 179a (reference numeral 179a is not shown)) of air vent tubes 178, 179 for opening the inside of a float chamber (not shown) inside the carburetor 62 to the atmosphere, or at the tail pipe 69a (see FIG. 1) of the muffler 69 (see FIG. 1). Between a horizontal line 185 and the horizontal line 27 passing through the lower ends of the openings 178a, 179a, the horizontal line 27 located at the lowermost position serves as the submergence limit of the vehicle.

The air vent tube 178 has one end portion connected to the right side surface of the carburetor 62, and has the opening 178a at the other end portion opened on the left side surface side of the carburetor 62. Similarly, the air vent tube 179 has one end portion 179b connected to the left side surface of the carburetor 62, and has the opening 179a at the other end portion opened on the right side surface side of the carburetor 62. The lower ends of the openings 178a, 179a are at the same height.

In FIG. 3, part of the vehicle component parts is omitted, for easy comparison between the height of the openings 178a, 179a of the air vent tubes 178, 179 of the carburetor 62 and the height of the controller 25.

Figure 4:
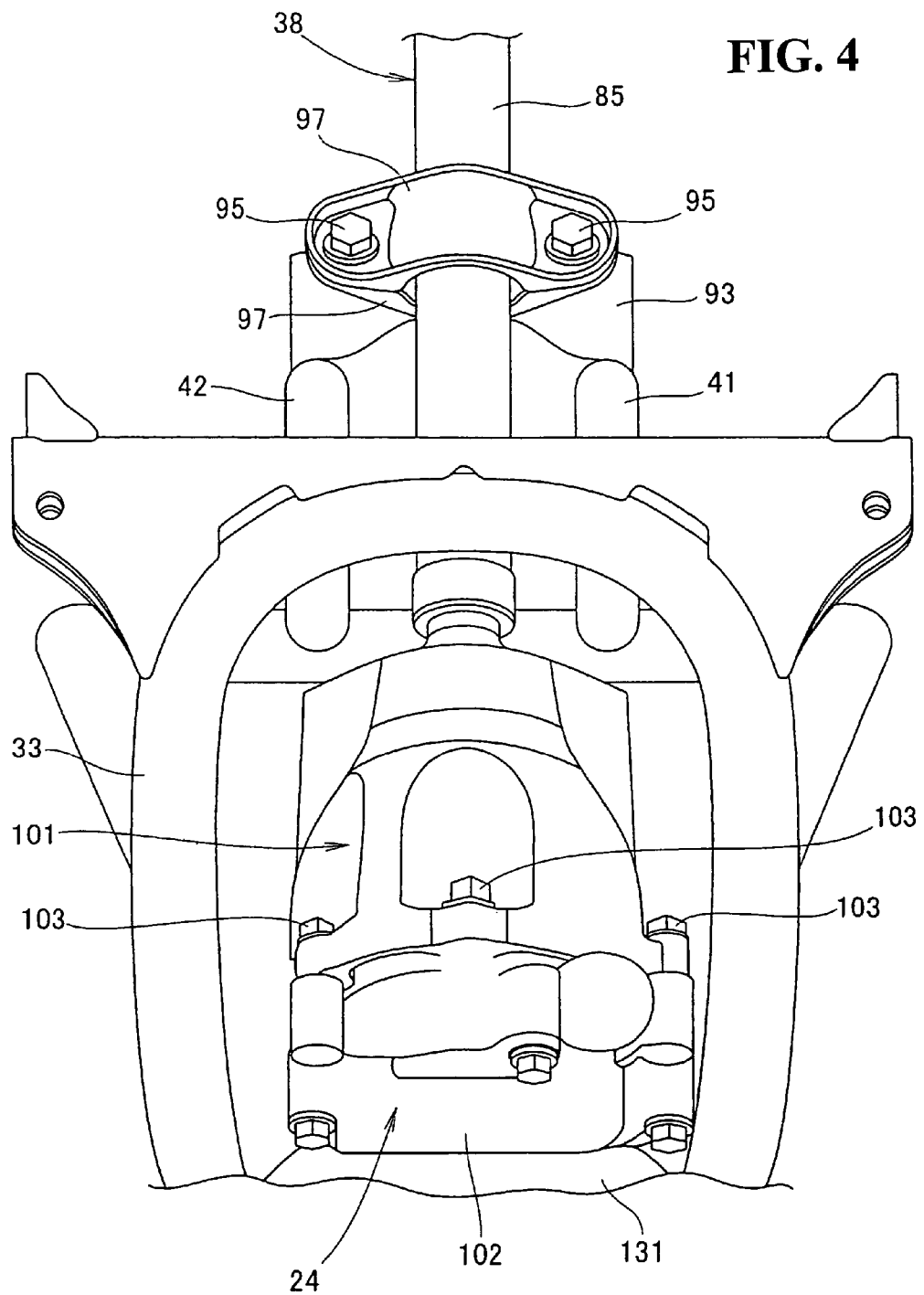
FIG. 4 is a front view of an essential part of the vehicle according to the present invention.

FIG. 4 is a front view of an essential part of the vehicle according to the present invention, and shows that the housing 101 is attached to the motor-driven power steering unit 24 by a plurality of bolts 103. An upper portion of the motor-driven power steering unit 24 is covered with the housing 101. With the upper portion of the motor-diven power steering unit 24 thus covered with the housing 101, the motor-driven power steering unit 24 can be protected from flying stones, rainwater, dust and the like.

Figure 5:
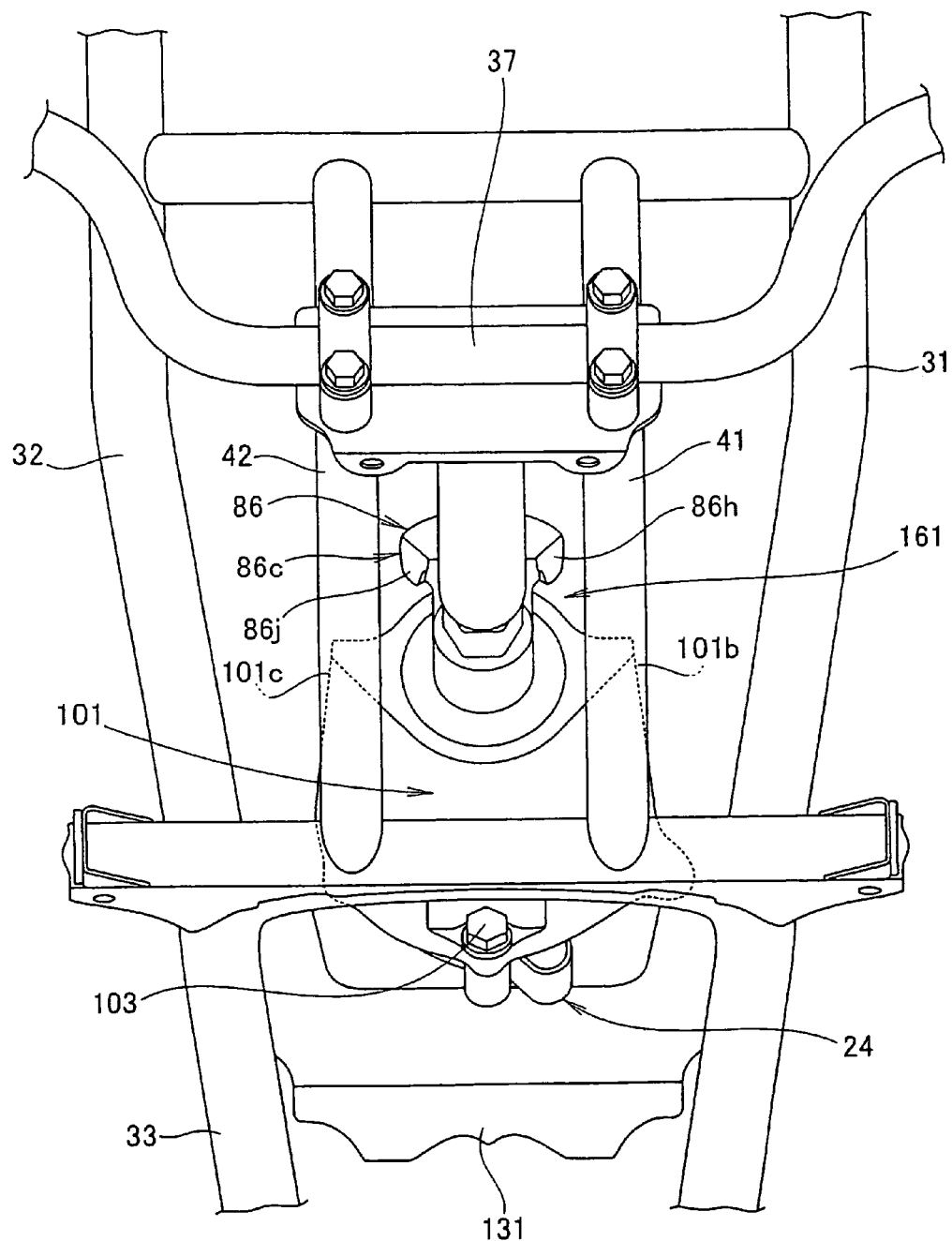
FIG. 5 is a plan view of an essential part of the vehicle according to the present invention.

FIG. 5 is a plan view of an essential part of the vehicle according to the present invention, and shows that an upper portion of the housing 101 and the L-shaped projected portion 86c of the lower shaft 86 constitute an upper steering handle stopper 161 for restricting the rotating range of the steering bar handle 37.

Figure 6A:
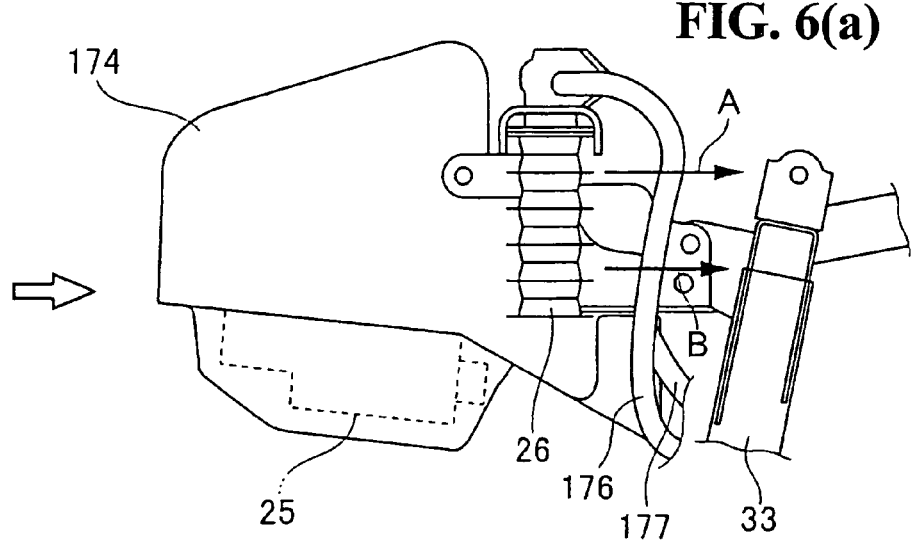
FIGS. 6a and 6b are operation diagrams showing the layout structure for the controller according to the present invention.
Figure 6B:
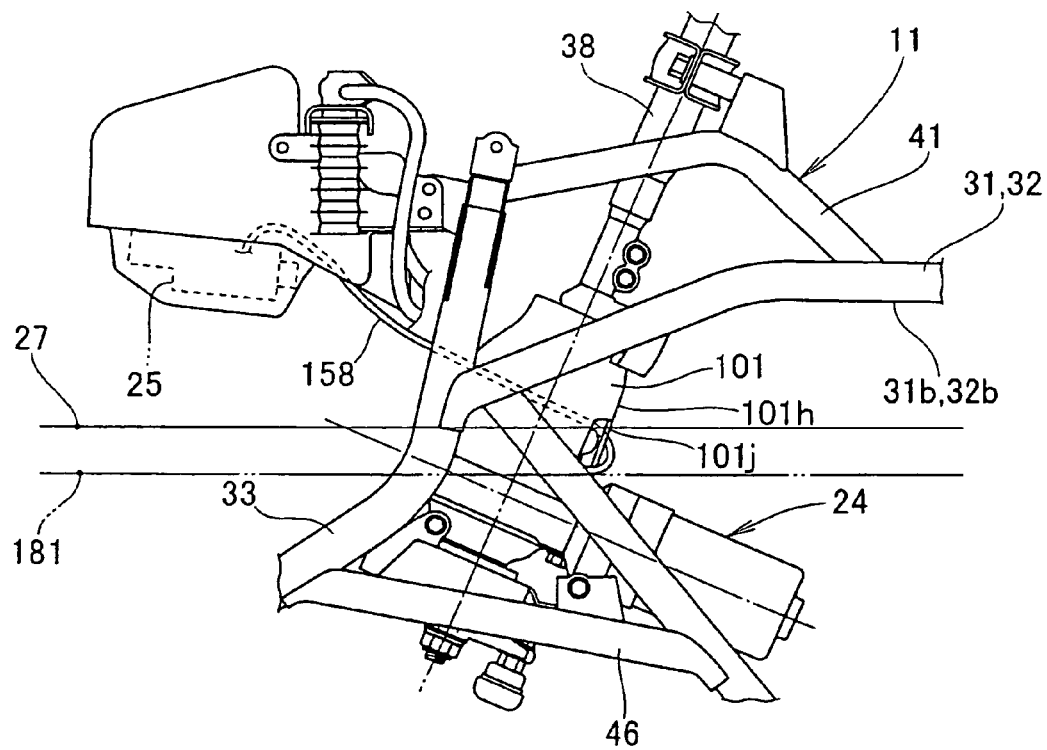

The operation of the layout structure for the controller 25 as above-described will be described below. FIGS. 6(a) and 6(b) are operation diagrams showing the layout structure for the controller according to the present invention.

In FIG. 6(a), during running of the vehicle, the temperature of the engine oil in the engine is raised due to the operation of the engine. In view of this, the oil is circulated in the oil cooler 26 to release heat, whereby the engine oil is cooled. The heat of the oil cooler 26 is carried toward the rear side of the oil cooler 26 as indicated by arrows A and B by the running airflow coming from the vehicle front side as indicated by the void arrow. Therefore, there is no fear that the heat of the oil cooler 26 might influence the controller 25 in the electrical equipment storage box 174.

In FIG. 6(b), the rear wall 101h of the housing 101 covering an upper portion of the motor-driven power steering unit 24 is provided with an opening 101j. A wire 158 for connection between the motor-driven power steering unit 24 and the controller 25 is passed through the opening 101j. Therefore, it can be made difficult for flying stones, rainwater, dust and the like to enter into the housing 101. In addition, with the housing 101 provided with the opening 101j, the laying of the wire 158 can be carried out readily.

In addition, even if the water surface 181 in the case where the vehicle is submerged has reached the horizontal line 27 indicating the submergence limit of the vehicle, immersion of the controller 25 in water can be obviated, since the controller 25 is located above the horizontal line 27 and the controller 25 is contained in the electrical equipment storage box 174 which is sealed.

As shown in FIGS. 1 and 6 above, according to the present invention, in the all-terrain vehicle 10 as the vehicle including the steering shaft 38 rotatably supported on the vehicle body frame 11, the steering bar handle 37 attached to the upper end of the steering shaft 38, the motordriven power steering unit 24 mounted onto the lower end of the steering shaft 38, and at least two front wheels 18, the controller 25 for controlling the motor-driven power steering unit 24 is laid out on the front side relative to the steering shaft 38 and above the horizontal line 27 serving as the submergence limit of the all-terrain vehicle 10.

With this configuration, the controller 25 is disposed on the front side relative to the steering shaft 38, whereby the all-terrain vehicle 10 can be made to run while observing the controller 25 and the water surface 181. Furthermore, with the controller 25 disposed above the horizontal line 27 of the all-terrain vehicle 10, submergence of the controller 25 can be prevented from occurring.

According to the present invention, the controller 25 is laid out on the front side relative to the oil cooler 26 for cooling the oil for the engine 12. This can ensure that the controller 25 is less liable to receive the heat of the oil cooler 26.

According to the present invention, as shown in FIGS. 2 and 6, the lower end of the steering shaft 38 is rotatably supported by the housing 101 annexed, in a turret-like form, to the motor-driven power steering unit 24, the rear wall 101h of the housing 101 is provided with the opening 101j, and the wire 158 for connection between the motor-driven power steering unit 24 and the controller 25 is passed through the opening 101j. This ensures that flying stones, rainwater, dust and the like would not easily enter into the housing 101, and the laying of the wire 158 is facilitated by the presence of the opening 101j in the housing 101.

According to the present invention, as shown in FIGS. 1 and 3, the horizontal line 27 as the submergence limit is at the atmosphere opening ends of the air vent tubes 178, 179 provided for the carburetor 62, or at the opening of the tail pipe 69a of the muffler 69. This ensures that submergence of the inside of the carburetor 62 or the inside of the muffler 69 can be obviated by paying attention to the horizontal line 27 as the submergence limit during running through a river, marshland, damp ground or the like.

The controller layout structure according to the present invention is preferable for use in a vehicle having a motor-driven power steering unit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A layout structure for a motor-driven power steering unit controller in a vehicle, comprising:
   a steering shaft rotatably supported on a vehicle body frame;
   a steering handle attached to an upper end of said steering shaft;
   a motor-driven power steering unit mounted onto a lower end of said steering shaft; at least two front wheels,
   an oil cooler adapted to cool engine oil; and a controller adapted to control said motor-driven power steering unit, wherein the oil cooler and the controller are attached to an upper bracket mounted on an upper portion of a front frame of the vehicle body frame, and the controller is disposed in front of said steering shaft and the oil cooler and above a submergence limit of the vehicle.

2. The layout structure for a motor-driven power steering unit controller as set forth in claim 1, wherein said oil cooler is disposed between the steering shaft and the controller, and
   a lower surface of controller extends further in a downward direction than a lower surface of the oil cooler.

3. The layout structure for a motor-driven power steering unit controller as set forth in claim 1, wherein the lower end of said steering shaft is rotatably supported on a housing that is added, in a turret-like form, to said motor-driven power steering unit.

4. The layout structure for a motor-driven power steering unit controller as set forth in claim 2, wherein the lower end of said steering shaft is rotatably supported on a housing that is added, in a turret-like form, to said motor-driven power steering unit.

5. The layout structure for a motor-driven power steering unit controller as set forth in claim 3, wherein a rear wall of said housing is provided with an opening, and a wire for connecting said motor-driven power steering unit and said controller passes through said opening,
   wherein the opening in the rear wall of the housing makes it possible to lay the wire, while preventing flying stones, rainwater, and dust to enter into the housing.

6. The layout structure for a motor-driven power steering unit controller as set forth in claim 4, wherein a rear wall of said housing is provided with an opening, and a wire for connecting said motor-driven power steering unit and said controller passes through said opening,
   wherein the opening in the rear wall of the housing makes it possible to lay the wire, while preventing flying stones, rainwater, and dust to enter into the housing.

7. The layout structure for a motor-driven power steering unit controller as set forth in claim 1, wherein said submergence limit is at an air opening end of an air vent tube provided for a carburetor, or at a tail pipe opening of a muffler.

8. The layout structure for a motor-driven power steering unit as set forth in claim 1, further comprising an electrical equipment storage box attached to the vehicle body frame, and said controller is contained in the electrical equipment storage box, and in order to prevent heat of the oil cooler from influencing the controller in the electrical equipment storage box, the oil cooler is disposed rearward of the electrical equipment storage box.

9. The layout structure for a motor-driven power steering unit as set forth in claim 2, further comprising an electrical equipment storage box attached to the vehicle body frame, and said controller is contained in the electrical equipment storage box.

10. The layout structure for a motor-driven power steering unit controller as set forth in claim 1, wherein the vehicle body frame includes upper main frames having upper straight portions, and said controller is located above a lower surface of said upper straight portions.

11. A vehicle, comprising:
a vehicle body frame;
a steering shaft rotatably supported on the vehicle body frame;
a steering handle attached to an upper end of said steering shaft;
a motor-driven power steering unit mounted onto a lower end of said steering shaft;
a controller that controls said motor-driven power steering unit; and
an oil cooler,
wherein the controller and the oil cooler are attached to an upper bracket mounted on an upper portion of a front frame of the vehicle body frame, and said controller is disposed in front of said steering shaft and said oil cooler.

12. The vehicle as set forth in claim 11, wherein said controller is disposed above a submergence limit of the vehicle, and
   wherein a lower surface of controller extends further in a downward direction than a lower surface of the oil cooler.

13. The vehicle as set forth in claim 11, wherein the lower end of said steering shaft is rotatably supported on a housing that is added, in a turret-like form, to said motor-driven power steering unit.

14. The vehicle as set forth in claim 12, wherein the lower end of said steering shaft is rotatably supported on a housing that is added, in a turret-like form, to said motor-driven power steering unit.

15. The vehicle as set forth in claim 13, wherein a rear wall of said housing is provided with an opening, and a wire for connecting said motor-driven power steering unit and said controller passes through said opening,
   wherein the opening in the rear wall of the housing makes it possible to lay the wire, while preventing flying stones, rainwater, and dust to enter into the housing.

16. The vehicle as set forth in claim 14, wherein a rear wall of said housing is provided with an opening, and a wire for connecting said motor-driven power steering unit and said controller passes through said opening,
   wherein the opening in the rear wall of the housing makes it possible to lay the wire, while preventing flying stones, rainwater, and dust to enter into the housing.

17. The vehicle as set forth in claim 11, wherein said submergence limit is at an air opening end of an air vent tube provided for a carburetor, or at a tail pipe opening of a muffler.

18. The vehicle as set forth in claim 11, further comprising an electrical equipment storage box attached to the vehicle body frame, and said controller is contained in the electrical equipment storage box, and in order to prevent heat of the oil cooler from influencing the controller in the electrical equipment storage box, the oil cooler is disposed rearward of the electrical equipment storage box.

19. The vehicle as set forth in claim 12, further comprising an electrical equipment storage box attached to the vehicle body frame, and said controller is contained in the electrical equipment storage box.

20. The vehicle as set forth in claim 11, wherein the vehicle body frame includes upper main frames having upper straight portions, and said controller is located above a lower surface of said upper straight portions.

* * * * *